(12) United States Patent
Tenhunen

(10) Patent No.: US 7,675,213 B2
(45) Date of Patent: Mar. 9, 2010

(54) REDUCTION OF HARMONICS IN AN ELECTRIC MOTOR

(75) Inventor: Asmo Tenhunen, Hyvinkää (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 11/808,484

(22) Filed: Jun. 11, 2007

(65) Prior Publication Data

US 2007/0241634 A1 Oct. 18, 2007

(51) Int. Cl.
*H02K 1/00* (2006.01)
(52) U.S. Cl. ...................................................... 310/216
(58) Field of Classification Search ................. 310/216, 310/254
See application file for complete search history.

(56) References Cited

U.S. PATENT DOCUMENTS

| | | | |
|---|---|---|---|
| 3,978,356 A * | 8/1976 | Spiesberger | 310/156.42 |
| 4,516,048 A | 5/1985 | Brigham | |
| 4,692,646 A | 9/1987 | Gotou | |
| 4,847,526 A * | 7/1989 | Takehara et al. | 310/185 |
| 5,107,159 A | 4/1992 | Kordik | |
| 5,642,009 A | 6/1997 | McCleer | |
| 5,734,217 A | 3/1998 | Morinigo | |
| 5,757,182 A * | 5/1998 | Kitazawa | 324/207.17 |
| 6,348,751 B1 | 2/2002 | Jermakian | |
| 6,424,073 B1 | 7/2002 | Kometani | |
| 6,433,456 B1 | 8/2002 | Higashino | |
| 2003/0111926 A1 * | 6/2003 | Decristofaro et al. | 310/216 |

FOREIGN PATENT DOCUMENTS

| | | |
|---|---|---|
| EP | 242673 A2 | 4/1987 |
| EP | 0 242 673 A2 | 10/1987 |
| EP | 0 463 168 A1 | 1/1992 |
| EP | 0 581 612 A1 | 2/1994 |
| GB | 688696 A | 3/1953 |
| JP | 58-116031 A | 7/1983 |
| JP | 10-23733 A | 1/1998 |
| SE | 455247 B | 6/1988 |
| SU | 955368 A1 | 8/1982 |

OTHER PUBLICATIONS

Kastinger G. et al; "Reducing Torque Ripple of Transverse Flux machines by Structural Designs," Power Electronics, Machines and Drives, Apr. 16-18, 2002, Conference Publication No. 487 IEE 2002, p. 320-324.
De Silva C.; "Design Equations for the Tooth Distribution of Stepping Motors," IEEE Transactions on Industrial Electronics, vol. 37, No. 2, Apr. 1990, p. 184-186.

* cited by examiner

*Primary Examiner*—Nguyen N Hanh
(74) *Attorney, Agent, or Firm*—Birch, Stewart, Kolasch & Birch, LLP

(57) ABSTRACT

In the present invention the positions of the slots or poles of the stator of an electric motor are changed in order to reduce the harmonics caused by the stator winding and any vibration caused by these harmonics. In the present invention a shape function is defined according to the new placement positions for the stator slots and/or stator poles. A conversion function sums for the slot placement positions to be given to equidistant stator slotting placement. In one embodiment of the invention the conversion function is the sum of sinusoidal functions and in its amplitude small in relation to the distance between the slots.

9 Claims, 5 Drawing Sheets

PRIOR ART

PRIOR ART

PRIOR ART

REDUCTION OF HARMONICS IN AN ELECTRIC MOTOR

FIELD OF THE INVENTION

Figure 1:
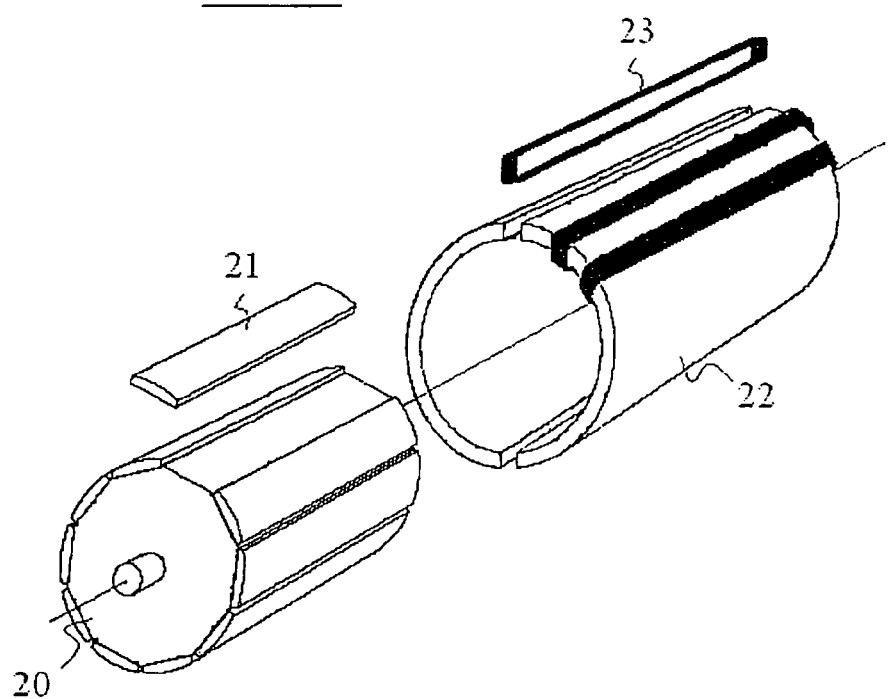

The present invention relates to electric motors and more specifically to the reduction of harmonics occurring in motors and the adverse effects caused by these harmonics.

BACKGROUND OF THE INVENTION

Electric motors convert electrical energy into mechanical energy. In electric motors of normal construction, the basic parts, such as a rotor with a shaft fitted to rotate, a stationary stator, bearings and end shields, can be distinguished. The rotor is situated so as to be supported by the bearings. Generally a small air gap is left between the rotor and the stator.

The operation of multiphase alternating-current rotating machines, such as a multiphase synchronous and asynchronous motor, is based on a magnetic field circulating inside the machine. A multiphase stator winding is formed such that a sinusoidal voltage is fed into the phase windings, with the voltages fed into the windings being at a 360/m angle to each other in the phase shift, where m is the number of phases, the currents passing through the stator windings thus creating a magnetic field that circulates the air gap in the machine, said magnetic field interacting with the magnetic field of the rotor windings thereby making the rotor rotate. The magnetic field in the rotor winding of synchronous machines is typically formed from either a permanent magnet or with direct current fed into the excitation winding of the rotor. Magnetization of the rotor winding in asynchronous machines is generally implemented via the voltages and currents induced in the rotor winding caused by the magnetic flux of the stator current.

The aim is for the distribution of the magnetic flux density of the air gap to be as purely sinusoidal as possible. The rotating motion of the rotor is achieved by means of the fundamental sinusoidal wave of the magnetic flux density, but in practice the magnetic field affecting a motor also contains harmonic terms, i.e. harmonic components of the pure wave.

The harmonics of the magnetic flux density cause extra force components between the stator and the rotor. Furthermore, the magnitude of the torque fluctuates (torque ripple) and additional losses occur in the motor. If the frequency and form of fluctuation of the of the force caused by a magnetic field containing harmonics are close to the mechanical natural frequencies of the motor, a loud noise and vibration of the machine can occur as a result of the harmonics. Further, constrained vibration is possible. In constrained vibration, forces are exerted on a component that cause it to vibrate, although the frequency of the excitation is not the natural frequency of the component. Additionally, harmonics can lead to faulty operation of measuring and protective equipment, to overvoltages and to overload situations.

In three-phase electric motors only odd harmonic terms of the magnetic field occur. Prior-art solutions have attempted to minimize the effect of harmonics by changing the basic winding of the stator, with a fractional-pitch winding, with slot wedges and with dispersed placement of the magnets. In modern motors, however, vibration and noise caused by the force components occurring at 6 times and 12 times the frequencies with respect to the frequency of the motor current have been evident, said force components resulting especially from the 5th, 7th, 11th and 13th harmonic terms of the flux density.

Harmonic components occur in the air gap flux density in a rotating electrical machine owing to both discontinuity of the windings on the rims of the stator and rotor and from fluctuations in the permeance in the air gap. The stator winding is generally concentrated in slots and coil groups, in which case the magnetomotive force produced in the air gap is not sinusoidally distributed. Permeance fluctuation in the air gap is caused by, among other things, possible slotting of the stator and rotor, salient poles and magnetic saturation. The harmonics of the magnetic field of an electric motor can be divided into harmonics caused by the rotor and harmonics caused by the stator.

Torque ripple occurs in other rotating field machines also, but the following addresses in particular permanent magnet synchronous motors, which can be axial flux or radial flux machines. In an axial flux machine the magnetic flux of the air gap of the machine is situated mainly in the direction of the shaft of the machine. In a radial flux machine, on the other hand, the magnetic flux of the air gap of the machine passes mainly in the radial direction with respect to the shaft.

Reduction of torque ripple caused by the rotor of permanent magnet machines is addressed, for example, in patent application US2004/0070300. In the solution presented in this publication the magnetic field caused by the rotor magnets is made as purely sinusoidal as possible by making the rotor magnets pole shaped and by skewing their placement. Solutions for reducing torque ripple caused by the rotor are also presented in, for instance, publications U.S. Pat. No. 6,380,658 and U.S. Pat. No. 5,886,440. Prior-art solutions also include reducing torque ripple caused by the rotor by dispersed placement of the magnets.

The publication written by Y. Akiyama et al., "Slot Ripple of Induction Motor and FEM Simulation on Magnetic Noise", Proceedings of the IEEE IAS 31st Annual Meeting, San Diego, USA, 1996, p. 644-651, addresses random placement of the slots of the rotor. The publication presents the reduction of the magnetic noise of induction motors by using non-equidistant distribution of the rotor slots. Three different types of rotor slotting principles (methods A, b and C) are presented. In methods A and B the rotor slots are situated completely randomly. The simulation result showed that the motor was very susceptible to saturation at the location of very thin teeth. In method C the slotting of the rotor is divided into quarters of the rim, and in each quarter the distance between slots is constant. Between adjacent quarters is a small displacement. Rotor A gives the best result in terms of interference components.

As previously stated, torque ripple is also caused by the stator, as a result of both harmonics caused by the discrete distribution of current in the circumferential direction of the stator and permeance fluctuation in the air gap caused by the stator slotting, for which the aforementioned publications do not offer a solution.

Prior-art solutions have attempted to reduce harmonics caused by distribution of the stator current with, among other things, a fractional-pitch winding or by using skewed slots. A fractional-pitch winding can eliminate slot harmonics of a certain order, but it cannot affect slotting harmonics. Skewed slots also distribute permeance on the rim more evenly, but using skewed slots complicates the process of manufacturing the motor and also reduces the torque available from the motor. It is known that using a magnetic slot wedge at the mouth of slots reduces permeance fluctuations caused by the slotting. By means of a slot wedge the permeance fluctuations can be made more even and the amplitude of certain harmonics reduced. For example, publication FI 112412 presents a method for manufacturing the winding of an electrical machine. In this method the winding coils are formed into their final shape before being placed in the slots. The winding coils are then placed so that they overlap, one coil being disposed at the base of the slot and the other coil placed on top of it. Additionally, in the method the slots are closed after placement of the winding coils with ferromagnetic slot wedges. By means of the slot wedges and by using fractional-pitch winding the harmonic terms can be damped to about one-quarter of the magnitude compared to a motor without slot wedges.

Publication. U.S. Pat. No. 6,285,104 presents a solution for reducing torque ripple wherein a different number of conductors can be placed in the stator slots such that the current vector fed sinusoidally into each slot is formed as similarly to the current vectors of the other slots as possible. In this method the width of the stator slot is determined by the number of conductors contained in the slot. The method also presents moving the rotor magnets in the direction of the circumference with respect to the stator. One drawback in the solution presented is, among other things, that it makes the process of manufacturing the stator and stator winding more difficult.

In prior-art solutions mechanical vibrations occurring in the motor are damped, as presented in e.g. publication WO 9826643. According to this publication a second voltage is fed into the current supply of the motor, the frequency of which is a certain multiple of the fundamental frequency. The frequency depends on the number of phases and on the number of stator slots per phase.

Based on publication FI 950145, it is a prior-art technique to manufacture the magnetic core (stator) of an axial motor as a cylindrically-shaped stack of plates in the following manner. A ribbon-like ferromagnetic plate is coiled into a cylindrical stack of plates either spirally or annularly. Before coiling into a roll, the exact positions of the stator slots on the plate are calculated and the slots are punched while the plate is in a straight plane with a special punching and slotting machine. The punching locations are not positioned equidistantly because the radius of the plate mass accumulating around the centre axis of the plate stack changes during the coiling. When the plate stack is fully coiled, the stator slots in the stack are located in the desired positions and are of the desired depth, and the walls of the slots are even.

The problem with this prior-art solution is that the vibration and noise caused by harmonics are not reduced in the best possible way with the prior-art methods. For example, the vibration caused by torque ripple in an electric motor in elevator usage can still be noticed as vibration and jerky motion of the elevator car. The noise caused by harmonics can also reduce passenger ride comfort.

PURPOSE OF THE INVENTION

The purpose of the present invention is to achieve a motor in which the harmonics caused by the stator winding and the stator slotting are smaller than in prior-art electric motors, and in which the adverse effects on the operation of the electric motor caused by harmonics are minimized.

SUMMARY OF THE INVENTION

The method of the invention, the motor of the invention, and other embodiments of the invention are characterized by what is disclosed in the claims.

Some inventive embodiments are also discussed in the descriptive section and drawings of the present application. The inventive content of the application can also be defined differently than in the claims presented below. The inventive content may also consist of several separate inventions, especially if the invention is considered in the light of expressions or implicit sub-tasks or from the point of view of advantages or categories of advantages achieved. In this case, some of the attributes contained in the claims below may be superfluous from the point of view of separate inventive concepts. The features of the various embodiments can be applied within the framework of the basic inventive concept in conjunction with other embodiments. The features presented in conjunction with the method and equipment can be applied in conjunction with each other such that the equipment of the invention can comprise features presented in conjunction with the method of the invention and vice versa. The procedural phases presented in conjunction with the method are not however necessarily bound to those appliances that are described in conjunction with the equipment, but can also be more general.

The method according to the invention is for forming an electric motor, said motor comprising a rotor, a stator, and a support structure for the rotor and stator, as well as an output for transmitting rotary movement out of the motor, such that the stator slots or pole cores, possibly containing slots, are situated on the rim of the stator in a placement differing from equidistant distribution. The method of placement of the stator slots and/or pole cores can be called dispersed placement of the stator slots and/or stator poles. The aim of placing the slots and/or poles at non-equidistant intervals is to reduce the harmonics caused by the stator winding and stator slotting, which in turn achieves reduced vibration, noise and losses of the motor. A stator slotted in the manner according to the invention can also be called a VSP (Variable Slot Pitch) stator. Deviating from equidistant placement preferably follows a certain symmetry between the different portions of the stator. The motor formed according to the invention can be an axial flux motor, wherein the stator of the motor is manufactured by coiling a ribbon-like ferromagnetic plate into a cylinder-shaped stack of plates around the centre axis of the plate stack, and in which method, before coiling the plate stack, notches are punched in the plate with a punching machine to form the slots.

In the electric motor of the invention a plurality of stator slots and/or pole cores are arranged on the rim of the stator in a placement diverging from equidistant distribution. Preferably the divergence from equidistant distribution is implemented in one portion of the stator such that the divergence from equidistant placement of the slots and/or poles situated in that portion are essentially symmetrical with the divergences of another portion of the stator. The inventive concept also includes a method for manufacturing a stator, wherein the poles and/or slots of the stator are deployed dispersed in accordance with the method of the invention. The slots can be made by e.g. punching, in other words by stamping a notch in the plate using an appliance suited to this perforating. One method of manufacturing a stator is to stamp slots in a planar ferromagnetic plate and then coil the plate spirally into a stack of plates.

One advantage of the solution according to the invention is that the harmonics caused by the stator of the motor are damped even to one-tenth compared to equidistantly distributed slotting. In this way, by means of the invention a motor is achieved that has a lower vibration and noise level, that has smaller power losses and that produces a more even torque than a prior-art motor. All prior-art arrangements and techniques can be used in the manufacture of the coils and windings of the motor of the invention, because the modifications made to the structure of the stator compared to equidistant placement can be made so small that they do not affect the manufacture of the coils or the winding process. The fundamental wave of the magnetic field important from the viewpoint of the operation of the motor thus remains in practice unchanged. Instead, the amplitude of the harmonics, of which with a three-phase machine the 5th, 7th, 11th and 13th harmonic terms are most essential from the viewpoint of vibration and noise, is substantially reduced.

LIST OF FIGURES

Figure 2:
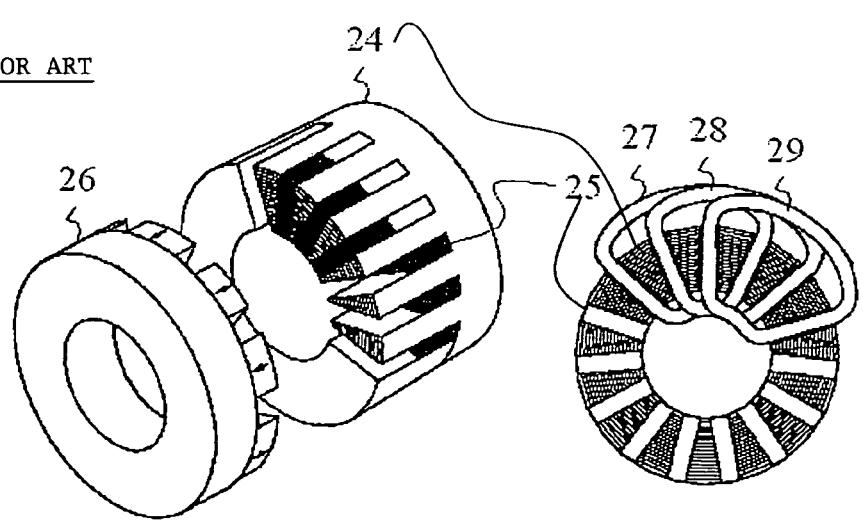
Figure 3:
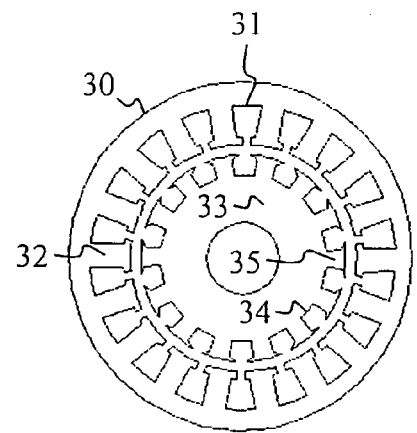
Figure 4:
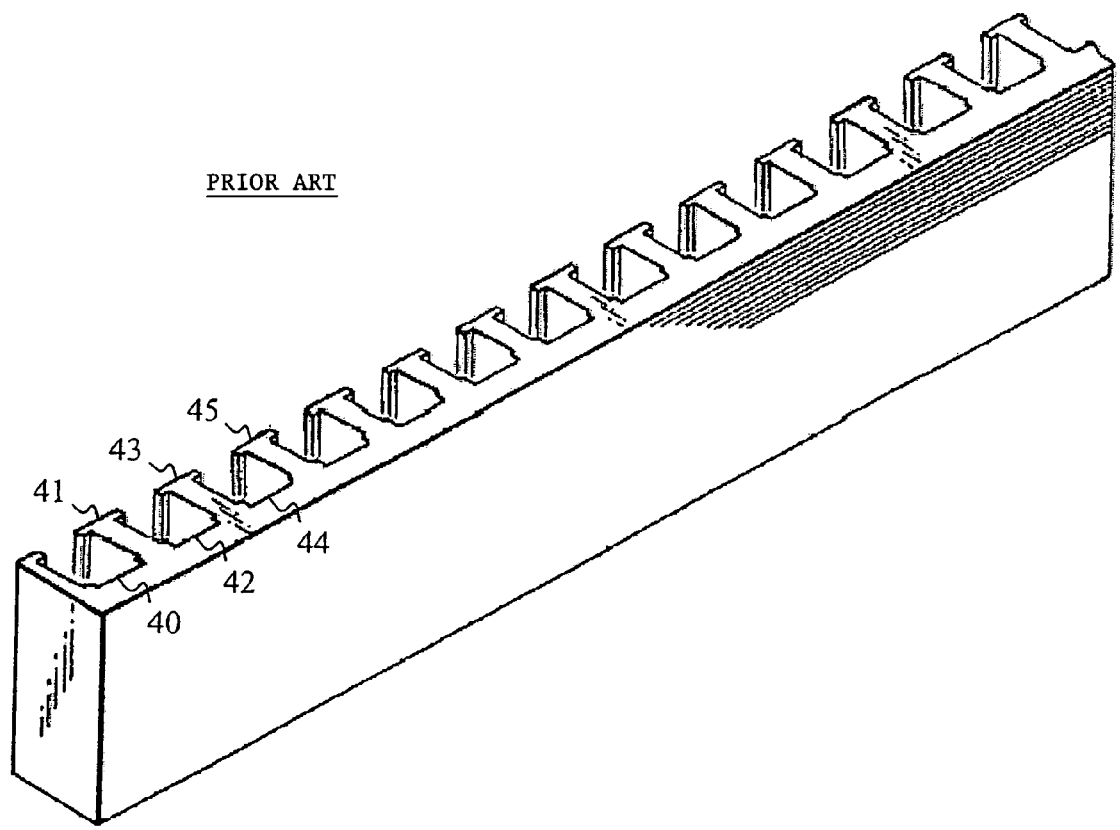
Figure 5A:
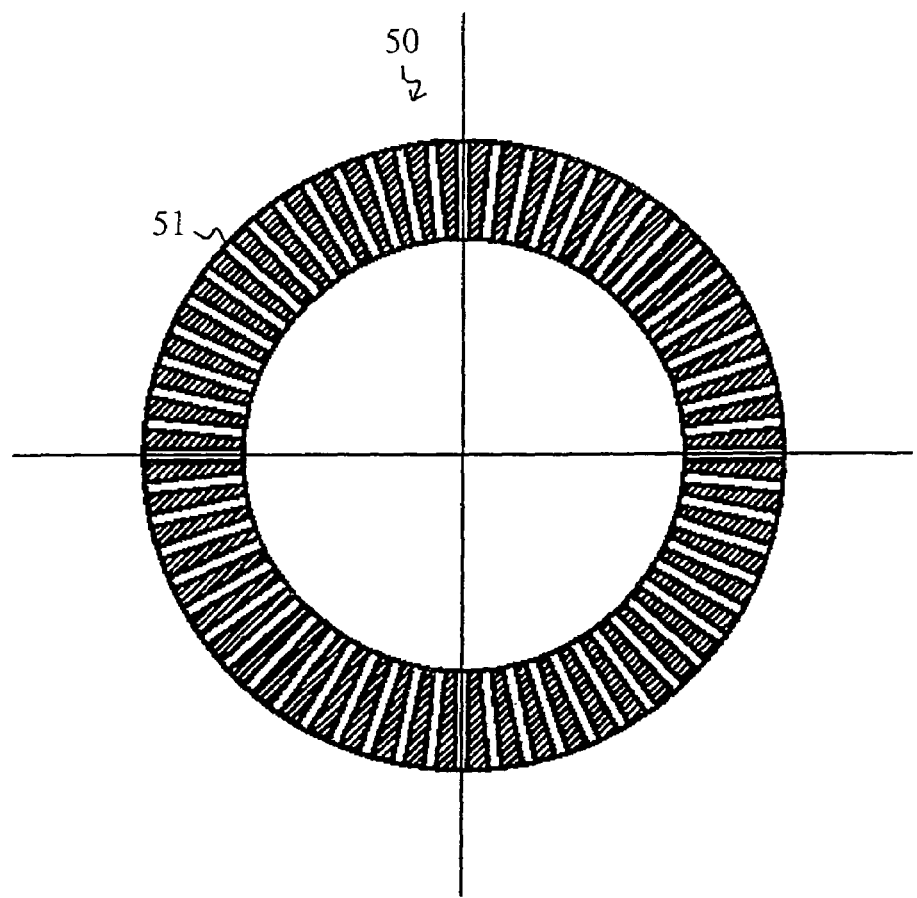
Figure 5B:
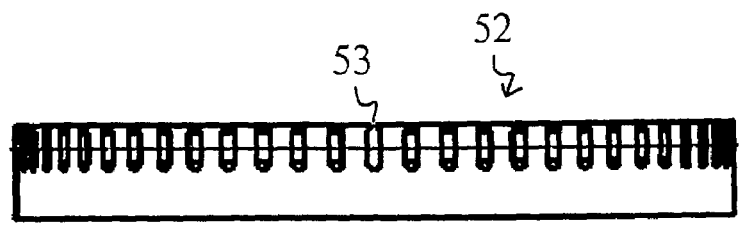
Figure 5C:
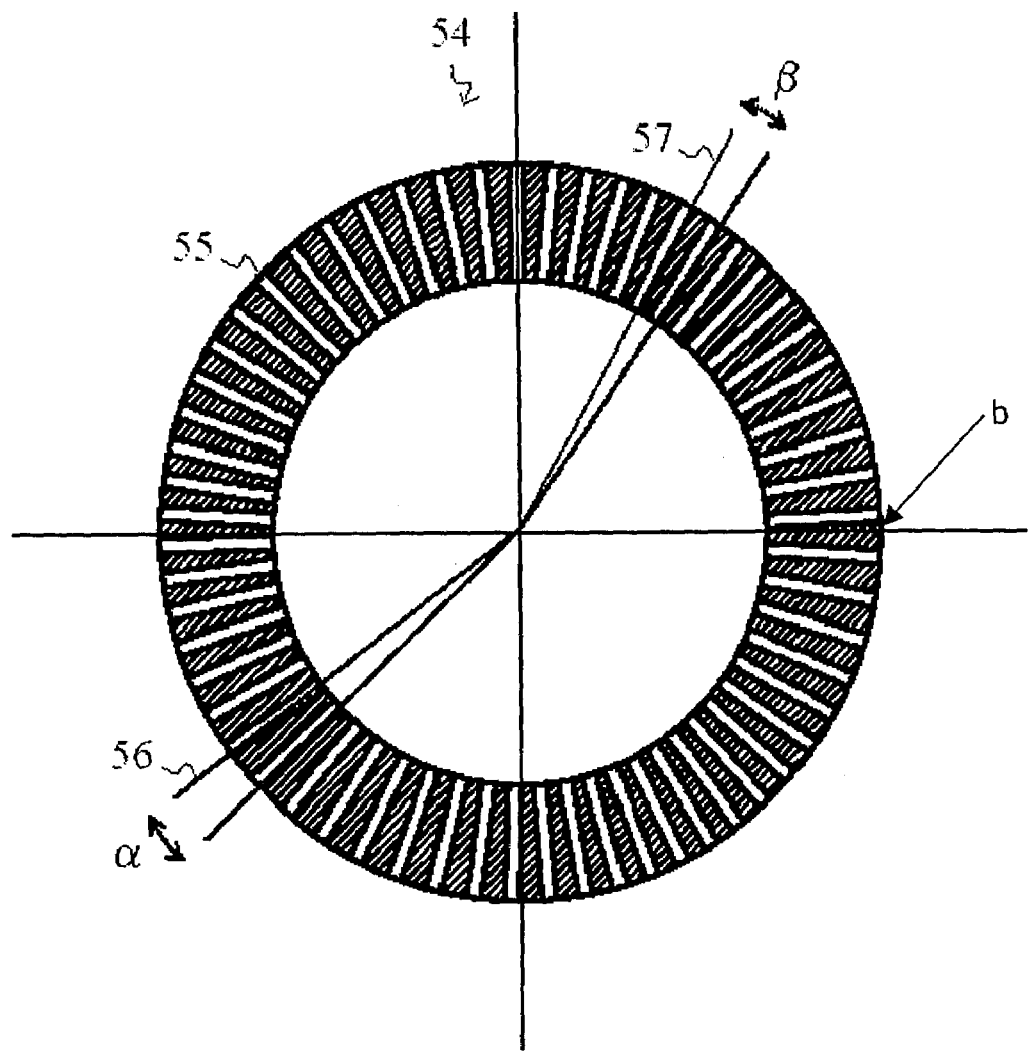
Figure 6:
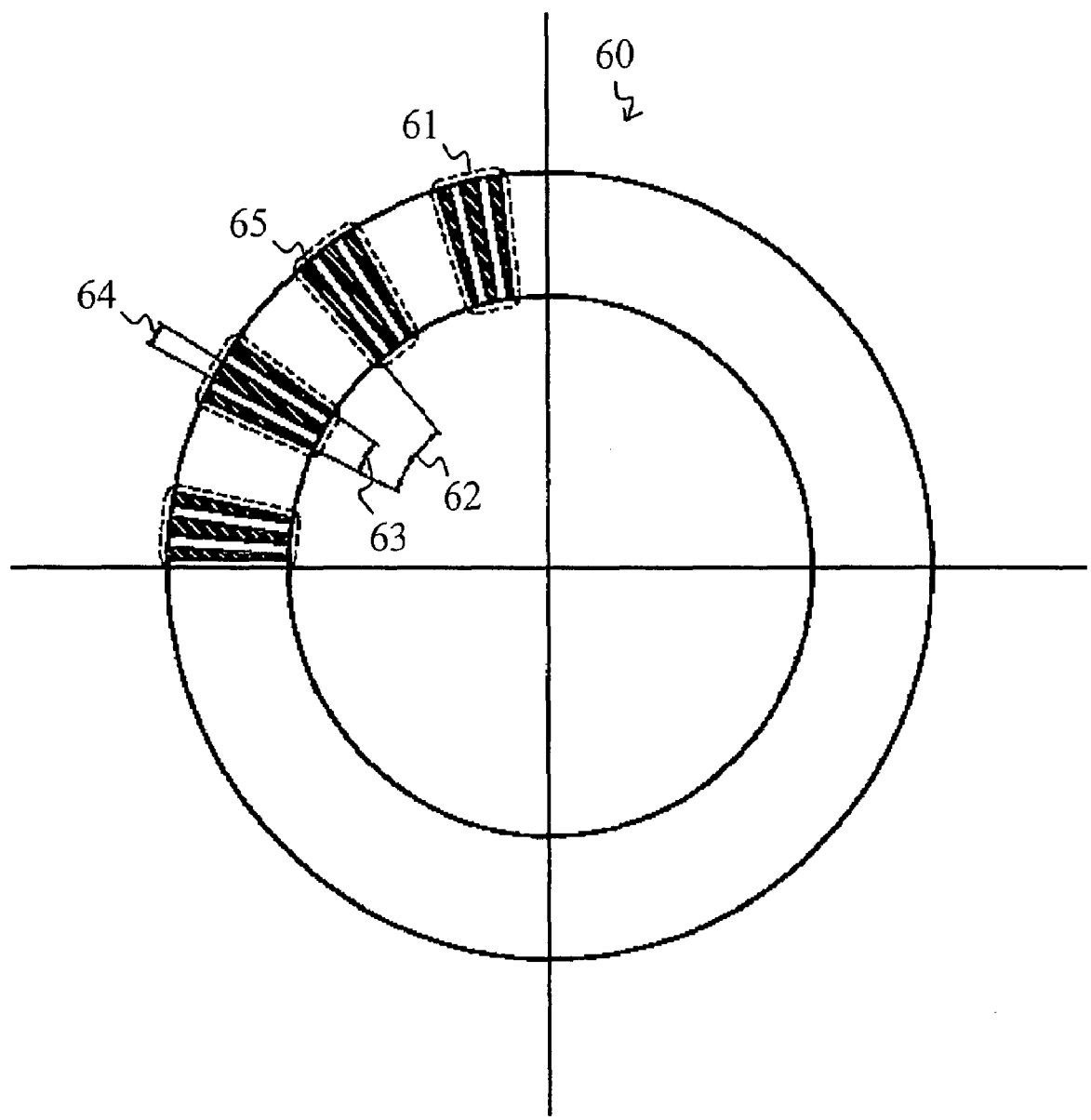

FIG. 1 presents an example of a prior-art radial flux machine equipped with a permanent magnet rotor, FIG. 2 presents an example of a prior-art axial flux machine equipped with a permanent magnet rotor, FIG. 3 presents a cross-section of stator and rotor frames slotted in accordance with prior-art techniques, FIG. 4 presents part of the rim of a stator in accordance with prior-art techniques opened out into a straight plane, FIG. 5a presents a cross-section of a prior-art stator frame provided with equidistantly distributed slotting, FIG. 5b presents a cross-section of a part of the stator frame provided with slotting according to the invention opened out into a straight plane, FIG. 5c presents a cross-section of a stator frame provided with slotting according to the invention, and FIG. 6 shows a diagrammatic representation of parameters that can be varied according to the invention.

DETAILED DESCRIPTION OF THE INVENTION

The method according to the invention is for forming an electric motor, said motor comprising a rotor, a stator, and a support structure for the rotor and stator, as well as an output for transmitting rotary movement out of the motor, and in which stator is a plurality of slots and/or poles, said plurality of stator slots and/or stator poles being positioned in a manner differing from equidistant distribution.

A winding for the stator of a multiphase electric motor can be arranged by e.g. making slots in the rim of the stator and by placing in the slots coils comprising insulated conductor loops, which are connected together to achieve the desired type of winding. The slot winding is typically formed as distributed such that the stator frame is divided into the number of zones determined by the number of phases (m) and the number of poles (2 p) of the motor, and in e.g. three-phase motors, the phases of which are called A-, B- and C-phases, one coil side of the coil of phase A belonging to the positive zone of phase A and the other coil side belonging to the negative zone of phase A. The coil sides of phases B and C are generally positioned between said coil sides in such a case. A winding can also be arranged as a centralized pole winding, wherein poles are formed on the stator rim by placing coils around the pole body, so that coil sides belonging to another phase are not left between the coil sides of one pole. Hereafter the term pole core is used to refer to the coil body and to any pole shoe that is part of it. Slotting may also be added to a pole core, in which case the pole winding can be formed from both coils placed around the pole body and placed in the slotting of the pole core.

In prior-art stators the slots or pole cores, in which the winding is formed, are typically distributed equidistantly on the stator rim. The construction of the stator causes harmonics owing to both the discrete distribution of current on the stator rim and to changes in permeance on the stator rim caused by the stator geometry. In the present invention the placement locations of the stator slots on the stator rim are moved from the conventional equidistantly distributed placement. This can be called dispersed placement of the stator slots. The same inventive concept includes the fact that when using pole windings the poles of the stator can be positioned at non-equidistant intervals. This can be implemented either by non-equidistant placement of the pole cores or their associated slots, and the non-equidistant placement can apply not only to the mechanical pole core but also to the magnetic axis of the pole.

The magnetic field caused by the stator winding is formed from the effect of the current passing through the winding. The current in the slot winding is centralized in the slots, so that the magnetomotive force produced in the air gap by the winding changes in jumps at the location of the slots. The aim is to design the winding so that the magnetomotive force produced is as purely sinusoidal as possible, because it is by means of exactly this fundamental frequency component that achieves the rotary movement of the rotor. The wave of a magnetomotive force that changes in jumps also however contains harmonics. The proportion of harmonic components can be examined by presenting the waveform of the magnetomotive force by means of a Fourier series, i.e. by presenting the waveform as the sum of the sine waves and cosine waves. Changing the placement of the slots can affect the harmonics content of the magnetomotive force produced. In the solution of the invention the positions of the slots are shifted from equidistant placement so that the harmonic composition of the waveform of the magnetomotive force produced changes such that a reduction is achieved in the proportion of the 5th, 7th, 11th and 13th harmonic terms, which have been noticed to be detrimental in an electrical machine. Non-equidistant placement of the slots also achieves dispersal of the permeance fluctuation in the air gap caused by the stator teeth thus damping the slot harmonic components of the magnetic field.

The non-equidistant placement according to the invention is preferably implemented such that despite the dispersed placement of the slots or poles there are at least two portions of the stator in which the deviations from equidistant placement of the slots and/or poles are symmetrical to each other. The symmetry can be e.g. mirror-image symmetry or the placement of the slotting and/or pole cores can be identically repeated in the two portions. A portion as referred to here means any part whatsoever of the stator in which the condition for symmetry is fulfilled, and which at its simplest can be e.g. a half section of the stator rim. Between the portions, however, can be parts of the stator in which the condition for symmetry is not fulfilled, and the portion meeting the symmetry requirement does not need to be an equidistantly distributed part of the stator. By means of a certain symmetry the winding can be implemented in non-equidistantly formed stator slotting or pole cores such that non-equidistant distribution of the winding does not caused undesirable force components between the stator and the rotor.

The placements of the slots and/or pole cores on the stator rim can according to the invention be determined by means of a shape function, which is formed by adding a so-called conversion function to the placement function describing the placement of slots of a stator that is slotted at equidistant intervals. The stator is formed such that the slots and/or poles are positioned essentially in accordance with the shape function.

FIG. 4 presents part of a prior-art stator that for the sake of graphical clarity has been opened out from its circular shape into a straight plane. The stator slots in FIG. 4 are situated at horizontally equidistant intervals, i.e. the distance between slots 40, 42 is the same as the distance between slots 42, 44, and likewise the distances between teeth 41, 43 and between teeth 43, 45 are of the same magnitude.

The placement of each slot on the rim of a stator rim with equidistantly distributed slotting in relation to a selected reference point can be presented by means of the placement function f (Formula 1)

$$f(k)=(k-1)*L/Q \quad (1)$$

Here Q is the number of stator slots, k is the ordinal number of the slot (1, 2, . . . , Q), and L is the length of the stator rim. Presented in the form of Formula 1 f(k) indicates the position of slot k as the distance from the reference point, which here is the slot with the ordinal number 1. With reference to FIG. 4 the symbol f(k) of Formula (1) can be considered the central point of the slot, i.e. the location point on the symmetry axis of the slot. Placement function f can also be formed such that the position of slot k is presented as an angle, in which case symbol L of Formula 1 is replaced with the value 360°. The positions of pole cores can correspondingly be addressed in place of the aforementioned positions of slots. In this case in placement function f the ordinal number of the slot is substituted by the ordinal number of the pole core in relation to the selected reference point and the number of slots Q is substituted by the number of poles 2 pm of the machine, where p is the number of pole-pairs of the machine and m is the number of phases.

The shape function expressing the placement of the slot or pole core is formed by adding the conversion function for varying the slotting to the placement function for equidistantly distributed slotting.

Slot placement in the solution is thus achieved according to Formula 2

$$M(k)=f(k)+H(k) \quad (2)$$

where M(k) indicates the placement of the slot for ordinal number k. Also the values of the shape function and the conversion function can be presented either as distances or as degrees of angle.

By means of Formula (2) information about placement of the teeth can also be obtained by using the ordinal number of the tooth in place of k, because the positions of the slots and the teeth are linked to each other. The fact that the widths of the teeth vary in dispersed placement of the slots must be taken into account, however.

Conversion function H can be e.g. a sine function in accordance with Formula (3)

$$H(k)=a*\sin(s*2\pi*f(k)/L) \quad (3)$$

where s is the symmetry number of the conversion function, which determines the number of symmetrical portions in the stator rim and a is the amplitude, which determines the magnitude of the change. If, for example, s=3, then three closer groupings and three sparser groupings are observed on the stator rim. Symmetry number s and amplitude a can be selected with the desired method.

The interval length of the sine function is preferably selected such that no discontinuity in the slotting seen in the cross-section occurs, i.e. the length of the inner rim of the stator is an exact multiple of the interval length of the sine function. The inner rim of the stator frame refers here generally to the rotor side of the rim. The conversion function can also be the sum of a number of sine functions. By means of Fourier expansion any continuous function whatsoever is achieved for this shape. Thus in the method of the invention a generally non-equidistant placement for the slots and/or poles on the stator frame is determined.

FIGS. 5a, 5b and 5c show a diagrammatic representation of the modification to equidistant distribution of the slotting for the slotting to accord with the invention. FIG. 5a shows a cross-section of the stator, wherein the slots 51 are positioned at equidistant intervals in accordance with prior-art technology. FIG. 5c presents a cross-section of a stator 54 in accordance with the invention. The positions of the slots 55 diverge slightly from those presented in FIG. 5a. It can be seen from FIG. 5c that in three points in the area of the cross-section there is denser slotting than the average and correspondingly in three points there is sparser slotting than the average. One of the three points in which the slotting is sparser is marked as point b in the diagram. From this point the minimum and maximum points of the distances between adjacent slots follow alternately at 60-degree intervals. It is thus possible to select angles α 56 and β 57 on the rim of the stator 54, which meet the condition α>β. The difference between the angles can be e.g. in the order of magnitude of one degree. The positioning of the slots in this example is determined using the sinusoidal conversion function, the symmetry number of which is three. The position of each slot 55 diverges from the values according to FIG. 5a by the amount of the values indicated by the conversion function. In the present example one interval of the sine function corresponds to one-third of the complete circle of the stator, i.e. 120 degrees, in other words the stator contains three symmetrical portions of 120 degrees. One-sixth of the stator rim could also be selected as a portion meeting the condition of symmetry in this example.

FIG. 5b presents one-third of the stator according to FIG. 5c, opened out into a straight plane and with the non-equidistant placement of the slots 53 accentuated for the sake of clarity.

In one preferred embodiment of the invention the slots are kept as standard width slots, and dispersed placement of the slots means the variation in the distances between the standard width slots. This is a simple solution in terms of manufacturing technique. Reduction of harmonics according to the invention is however also possible using stator slots of non-standard width.

The concept of the invention can be applied to windings formed using prior-art techniques, such as e.g. lap windings, in which the coil ends in the finished winding are positioned overlapping each other, and concentric windings, in which the coil ends are positioned on the same level.

Dispersed displacement of the poles can be implemented by e.g. modifying the angles between the standard width pole cores, by modifying the width of the pole cores keeping the angles between the pole cores constant, or by modifying both the aforementioned widths and angles. Any variables that can be varied in a pole winding of a stator according to the invention are graphically presented in FIG. 6. FIG. 6 presents the stator frame 60 of an axial flux machine and four slotted pole cores 61 arranged in it. In the solution according to the invention the divergence from equidistant placement can be implemented in the angles 62 between the pole cores, in the widths 63 of the pole cores, in the angles 64 between the slots and in the positioning of the slots 65 in the pole core 61. The pole cores can also be unslotted, in which case of course the variable parameters are the angles 62 between the pole cores and the widths 63 of the poles. In the solution according to the invention the divergence from equidistant placement can focus on one or more of the aforementioned parameters. Thus in the method according to the invention it is possible to e.g. select the required width of the pole core and after this determine the non-equidistantly distributed positions of the poles on the stator rim, or alternatively to first select the value for the angles between the poles and after this determine a slightly differing width for each pole core. Further, non-equidistantly distributed positioning for the slots in the pole cores can be determined. The widths and positions of the pole cores and slots can be expressed either as a length measurement or as an angular value.

The invention can be applied to a radial flux machine, in which case the slotting or pole cores according to the invention can be implemented e.g. in the manufacturing process of the stator plates, or to an axial flux machine, in which case the slotting and/or pole cores according to the invention can be implemented e.g. in the manufacturing process of the stator strip.

The electric motor of the invention comprises a stator, in which there are slots and/or poles, a rotor, a support structure for these as well as an output for transmitting rotary movement out of the motor, and the stator slots and/or poles are arranged in a placement differing from equidistant distribution. Preferably the divergence from equidistant distribution is made such that the divergences from equidistant placement of the slots and/or poles in at least one portion of the stator are symmetrical with at least one other portion of the stator. Examples of the types of electric motors to which the invention can apply are presented in FIGS. 1-3. FIG. 1 presents an example of the active parts of a permanently magnetized radial flux machine. The rotor 20 of the machine is manufactured from e.g. steel or from electrical plate. The permanent magnets 21 are disposed on the surface of the rotor. The stator 22 can also be manufactured from electrical plate. The stator of the example is made from two halves. The coils 23, which can be formed from e.g. insulated copper conductor, are disposed on the stator 22 in e.g. a ring-like fashion as shown in the figure. The main direction of the magnetic flux between the rotor and the stator is radial as viewed from the shaft.

FIG. 2 presents an example of the active parts of a permanently magnetized axial flux machine. The stator of the machine contains slotting, but an axial flux machine can also be implemented with pole windings. In the machine shown as an example in the figure permanent magnets are positioned on the rotor 26, and the winding of the stator 24 is made in the slots 25. Three stator coils 27, 28, 29 are marked in the figure. The direction of the magnetic flux of the machine in the air gap between the rotor and the stator is mainly in the direction of the shaft of the machine.

FIG. 3 presents a cross-section of the stator and rotor frames of a motor slotted in accordance with prior-art techniques. The inner rim of the stator 30 has slots 31 and teeth 32 between said slots. The rotor 33 also has slots 34 and teeth 35, and a narrow air gap is located between the rotor 33 and the stator 30, in which air gap the magnetic flux passes from the stator 30 to the rotor 33 and back. Windings are disposed in the slots 34, 31 of both the rotor 33 and the stator 30. In this type of motor it is also possible if necessary to apply dispersed placement of the slots according to the invention to the rotor side to reduce harmonics originating from the rotor.

In one preferred embodiment of the invention the deviations from equidistant placement of the slots or poles formed with the conversion function are so small that changing the normal equidistant placement to accord with the invention does not affect the manufacture of the stator coils or the winding. The new placement of the slots according to the method can be implemented by making a software adjustment to the machinery with which the slots are made in the stator strip or electric plate.

In one preferred embodiment of the invention the divergence from equidistant placement of the slot and/or pole is formed by means of at least one sine function to be the same magnitude as the value of the conversion function. In one preferred embodiment the symmetry number of the conversion function is selected as s=2. It is characteristic for the method according to the invention that by using a larger s value a larger a value is also needed to achieve the same effect of damping harmonics.

In another embodiment of the invention the symmetry number s of the conversion function is selected to be at least as large as s=2. In certain embodiments even s values are preferred to odd ones, because with odd pole-pair numbers of the conversion function the composite force exerted on the rotor diverges from zero, which can cause wear on the bearings. Odd symmetry numbers, including the symmetry number 1, are however possible and in e.g. slowly rotating axial flux machines these can be preferable.

The inventive concept of the present invention also includes a concept for manufacturing a stator with dispersed placement of slots or pole cores. One manufacturing method is to notch slots in the stator plate or stator strip and form a stator stack from the notched plates or notched strip. The different layers of the stator structure can be fastened together e.g. by welding. In the case of a stator strip, e.g. when an axial flux machine is the case in question, it is preferable to first calculate the location points of the stator slots or stator poles, and after this punch the slots in the strip and finally coil the slotted plate into a spiral shape e.g. in accordance with the method presented in publication FI 950145. Slots can be made in the plate stack also after coiling into a spiral. In this case it is preferable to use laser cutting for slotting, because if punching of the slots is done to the finished plate stack there is a danger that harmful short-circuits form between the different layers of the plate as a result of fraying caused by the punching.

The inventive concept further includes a manufacturing method for the stator of an electric motor, wherein dispersed placement of the slots according to the invention is achieved by using the shape function and conversion function of the invention in determining the positions of notches in the ferromagnetic plate to be coiled into a ribbon-like plate stack. Publication FI 950145 presents a method and an apparatus, with which a cylinder-shaped stator with equidistantly positioned slotting can be formed by punching notches in the ferromagnetic plate or stator strip such that the final slots are aligned on the cylindrical plate stack despite the fact that the distance between two notches on the stator strip increases as the diameter of the plate stack grows. By increasing the distance between two notches in accordance with a correction factor dependent, among other things, on the diameter of the plate stack, the notches are positioned such that when the strip is coiled, equidistant stator slotting has been formed in the stator. According to the present invention a conversion function is added to the slot placement function describing equidistant slotting, from which a shape function describing the shape of the slotting is obtained. The stator is manufactured such that notches are punched in ferromagnetic plate, increasing the distance between two notches by a correction factor dependent on the radius of the plate stack so that non-equidistant slotting according to the shape function forms in the finished plate stack. The method of the invention can be implemented by making a software modification to the appliance presented in publication FI 950145, with which the placement describing equidistant slotting is modified with a conversion function. Because the stator slotting according to the invention can be implemented such that the changes in the positions of the slots with respect to a stator having a corresponding number of equidistant slots are very small, stator coils similar to each other and manufactured for equidistant stator slotting can be used in a stator according to the invention.

Especially in elevator motors the largest possible torque is desired from the motor, but the outer diameter of the motor should be small because of restricted space. This means in practice that the aim is to make the outer diameter of the stator of an elevator motor as large as possible with respect to the diameter of the motor, so it is preferable to keep the space remaining for the ends of coils as small as possible. In accordance with the invention stator coils of the same size as each other can be placed in non-equidistantly positioned slots to form a winding such that the wound stator can still be fitted into the same sized motor frame as a stator having a corresponding number of equidistant slots and wound in a corresponding manner. For example in a stator, which is provided with a double-layer lap winding, of a permanently magnetized axial flux motor designed for elevator use, the diameter of the outer rim of which is 320 mm and the largest divergences in the distances between two adjacent slots is less than a millimeter, a stator wound with stator coils of the same size as each other can be fitted into a stator frame with an inner diameter of 380 mm. Adopting the method of the invention thus does not require any change in the manufacture of the stator coils. Further, using coils of the same size as each other in a stator with non-equidistant placement of its slotting gives the advantage that the winding process remains just as simple as in manufacturing a stator having equidistant slotting, as the position of an individual coil on the stator rim is not established on the basis of the divergence of its width from the other coils. One advantage in making small changes to the slotting with respect to equidistant placement is also that that the selected harmonics of the flux can be damped without this having a significant effect on the fundamental wave.

In one embodiment of the invention the placement function, conversion function and shape function of equidistant slots are formed as measurement lengths on the inner rim of the plate stack. Punching of the plate stack starts from the end of the strip that will be on the inner rim of the plate stack and as the punching progresses to the points of the strip that will be on a larger diameter in the plate stack, increasing the distance between two slots by a correction factor dependent on the diameter of the plate stack.

In one embodiment of the invention the positions on the stator rim of the slots of equidistant slotting, the conversion function and the shape function are presented as angular values. When implementing in practice the placement of the invention for the slots or pole cores as determined by the shape function, the values of the shape function or conversion function must often be rounded up or down, which slightly affects the symmetry of the resultant stator. The slotting or pole cores according to the invention are preferably implemented such that the actual position of the slot and/or pole do not diverge substantially from the value given in Formula 3 despite the rounding up or down. For example a divergence between the actual position and the position described by the shape function corresponding to ten percent of the amplitude of the conversion function can however be regarded as a sufficiently small divergence from the viewpoint of meeting the symmetry condition.

As one application of the present invention the slots and teeth of the stator of the motor can be measured e.g. such that the width of a tooth is 5 millimeters In one embodiment of the invention the placement function, conversion function and shape function of equidistant slots are formed as measurement lengths on the inner rim of the plate stack. Punching of the plate stack starts from the end of the strip that will be on the inner rim of the plate stack and as the punching progresses to the points of the strip that will be on a larger diameter in the plate stack, increasing the distance between two slots by a correction factor dependent on the diameter of the plate stack.

In one embodiment of the invention the positions on the stator rim of the slots of equidistant slotting, the conversion function and the shape function are presented as angular values. When implementing in practice the placement of the invention for the slots or pole cores as determined by the shape function, the values of the shape function or conversion function must often be rounded up or down, which slightly affects the symmetry of the resultant stator. The slotting or pole cores according to the invention are preferably implemented such that the actual position of the slot and/or pole do not diverge substantially from the value given in Formula 3 despite the rounding up or down. For example a divergence between the actual position and the position described by the shape function corresponding to ten percent of the amplitude of the conversion function can however be regarded as a sufficiently small divergence from the viewpoint of meeting the symmetry condition.

As one application of the present invention the slots and teeth of the stator of the motor can be measured e.g. such that the width of a tooth is 5 millimeters in magnitude and the width of a slot is 7 millimeters in magnitude.

One application of the present invention is a motor in which the stator winding is a fractional-pitch winding, using e.g. a fractional pitch of $5/6$.

In one preferred embodiment of the present invention one sine function is used as the conversion function, for which an amplitude of 0.3 millimeters is selected. When the symmetry number of the shape function is two, substantial damping of the fifth, seventh, eleventh and thirteenth harmonic is achieved. At the same time however the amplitude of the fundamental wave does not in practice change.

In a second preferred embodiment 0.3 millimeters is selected as the amplitude of the conversion function and three as the symmetry number. In a third preferred embodiment 0.2 millimeters is selected as the amplitude of the conversion function and two as the symmetry number. In both the second and third preferred embodiments substantial damping of particularly the 11th and 13th harmonic is achieved.

One application of the present invention is the flat type of motor used as the power source for elevator systems, such as that described in publication EP 676357. The motor contains a laminar stator and a laminar rotor. Permanent magnets are disposed on the surface of the rotor plate. The essential parts of the motor have been rendered very flat in shape in a solution according to EP 676357, as a result of which the motor can be deployed directly in the elevator shaft and no separate machine room is then needed.

The invention is not however limited to an individual application, but can be applied to electric motors in general. Another preferred application is the drive machineries of escalators.

It is obvious to the person skilled in the art that the invention is not limited to the embodiments described above, in which the invention is described using examples, but that many adaptations and different embodiments of the invention are possible within the frameworks of the inventive concept defined by the claims presented below.

The invention claimed is:

1. Electric motor, in which there is a stator including a plurality of slots and/or poles, which stator is made of ferromagnetic material, a rotor, and a support structure for the rotor and the stator, as well as an output for transmitting rotary movement out of the motor wherein the plurality of slots and/or poles are arranged in the stator in a manner diverging from equidistant distribution such that the divergence of the positioning of the slot and/or pole from equidistant positioning is the same magnitude as the value of the conversion function, formed by means of at least one sine function.

2. Electric motor according to claim 1, wherein the divergences of the positioning of the slots and/or poles from equidistant positioning are in at least one portion of the stator symmetrical with the divergences in at least one other portion of the stator.

3. Electric motor according to claim 1, wherein changes to the structure of the stator with respect to equidistant placement are made so small that they do not affect the manufacturing of the coils or the winding process.

4. Electric motor according to claim 1, wherein the rotor of the electric motor is permanently magnetized.

5. Electric motor according to claim 1, wherein the electric motor is an axial flux machine.

6. Electric motor according to claim 1, wherein the electric motor is a radial flux machine.

7. Electric motor according to claim 1, wherein the winding of the stator is a fractional-pitch winding.

8. Electric motor according to claim 1, wherein the electric motor is used as the power source of an elevator system.

9. Electric motor according to claim 1, wherein the stator is slotted by punching slots in the stator plate or stator strip and by forming the stator stack from the slotted plate or the slotted strip.

* * * * *